Figure 1:
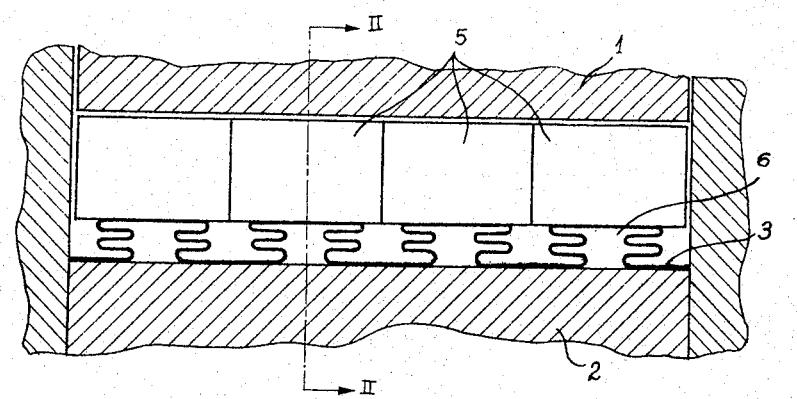

United States Patent Office 3,286,646
Patented Nov. 22, 1966

3,286,646
SPRINGS FOR THE PACKINGS OF
ROTARY ENGINES
Lucien Peras, Billancourt, France, assignor to Regie
Nationale des Usines Renault, Billancourt, France
Filed June 22, 1964, Ser. No. 376,864
Claims priority, application France, June 26, 1963,
939,463, Patent 1,383,762
1 Claim. (Cl. 103—136)

This invention relates to springs for the packings or like sealing means used in rotary engines, notably the packings provided for sealing the joints between the rotor and stator of these engines.

In applicant's U.S. Patent No. 3,175,503, it is proposed to make these packings of separate elements or sections adapted to accommodate as close as possible the distortion of the engine components.

It is the essential purpose of this invention to provide a specific form of embodiment of packing springs for rotary engine components which are adapted to exert an elastic pressure against the plurality of separate elements constituting a packing, these springs consisting each of a single, suitably bent blade forming a series of small elastic parallel bellows extending transversely in relation to the general direction of the spring blade, each bellows corresponding preferably to one element of said packing.

This form of embodiment is characterized by many advantageous features with respect to known structures; thus, the spring according to this invention is easy to fit and since it will not undergo any change in shape in the longitudinal direction, any friction and wear resulting from such deformation are avoided.

Figure 2:
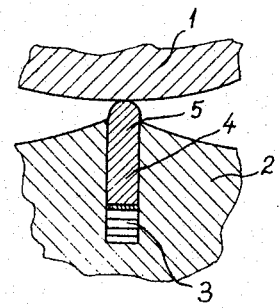

In order to afford a clearer understanding of this invention and of the manner in which the same may be carried out in practice, reference will now be made to the accompanying drawing illustrating diagrammatically by way of example a typical form of embodiment of the packing spring constituting the subject-matter of the invention. In the drawing:

FIGURE 1 is a longitudinal section showing the spring with the packing element engaged thereby, and FIGURE 2 is a cross-section taken upon the line II—II of FIGURE 1, showing the relative arrangement of the packing elements and spring in a stator groove.

It will be assumed that the rotary engine in which the packing springs of this invention are to be fitted comprises a rotor 1 and a stator 2, the packings adapted to seal the joint between adjacent working chambers of the engine being disposed in the stator and being in frictional contact with the rotor. Of course, it would not constitute a departure from the present invention to provide the reverse arrangement in which the packing elements are carried by the rotor and engage the stator.

In FIGURES 1 and 2 it will be seen that the spring 3 according to this invention is fitted in the bottom of a groove 4 formed in the stator 2 in which the packing segments or strips 5 are also slidably fitted, the spring urging these strips against the registering surface of rotor 1.

According to this invention, this spring consists of a single blade shaped in the manner shown in FIGURE 1, that is, in the form of a series of small interconnected bellows-like parallel springs 6 disposed side by side. Each bellows comprises one or several folds, and preferably corresponds to one element of the packing.

This spring may be manufactured in any suitable manner and heat-treated to provide the characteristics best suited for the specific conditions of operation contemplated, notably in view of the temperature to which it is to be subjected during the engine operation.

This spring is characterized by many advantageous features with respect to known advocated springs designed for this specific use:

It is more economical and easier to fit than helical springs;

It will not undergo any distortion in the longitudinal direction as contrasted with corrugated springs of which the bearing surfaces move as the sag varies, thus producing frictional contacts causing wear and therefore a substantial alteration in the spring characteristics.

Of course, many modifications and variations may be contemplated in the practical embodiment of the spring illustrated and described herein, without departing from the spirit and scope of the invention. Thus, the relative proportions and dimensions of the various bellows-like portion of the spring, as well as their number, and the material used for making this spring, may vary considerably without departing from the spirit and scope of the invention as set forth in the appended claim.

I claim:

In a rotary motor having a stator and a rotor turning within the stator, the improvement comprising a plurality of packing elements contiguously arranged in a stator groove to fix the boundaries of the operation chambers between the rotor and the stator, a plurality of springs positioned in the groove bottom to urge said packing elements against the rotor thus forming a continuous joint, said springs being formed by a thin plate folded so that said springs are of a bellows shape and extend parallel to each other and transverse to the general direction of said plate, each of said springs engaging a corresponding packing element so that said packing elements are subjected to an independent elastic force.

References Cited by the Examiner
UNITED STATES PATENTS 2,635,933  4/1953  Engelhardt _____ 277—160
3,106,404  10/1963  Morgitose _____ 277—148

FOREIGN PATENTS 598,766  2/1948  Great Britain.

ARTHUR L. LA POINT, *Primary Examiner.*

R. M. WOHLFORTH, *Assistant Examiner.*